Nov. 4, 1952 — C. E. MASON — 2,616,440
PNEUMATIC CONTROL MECHANISM
Filed Aug. 3, 1944 — 5 Sheets-Sheet 1
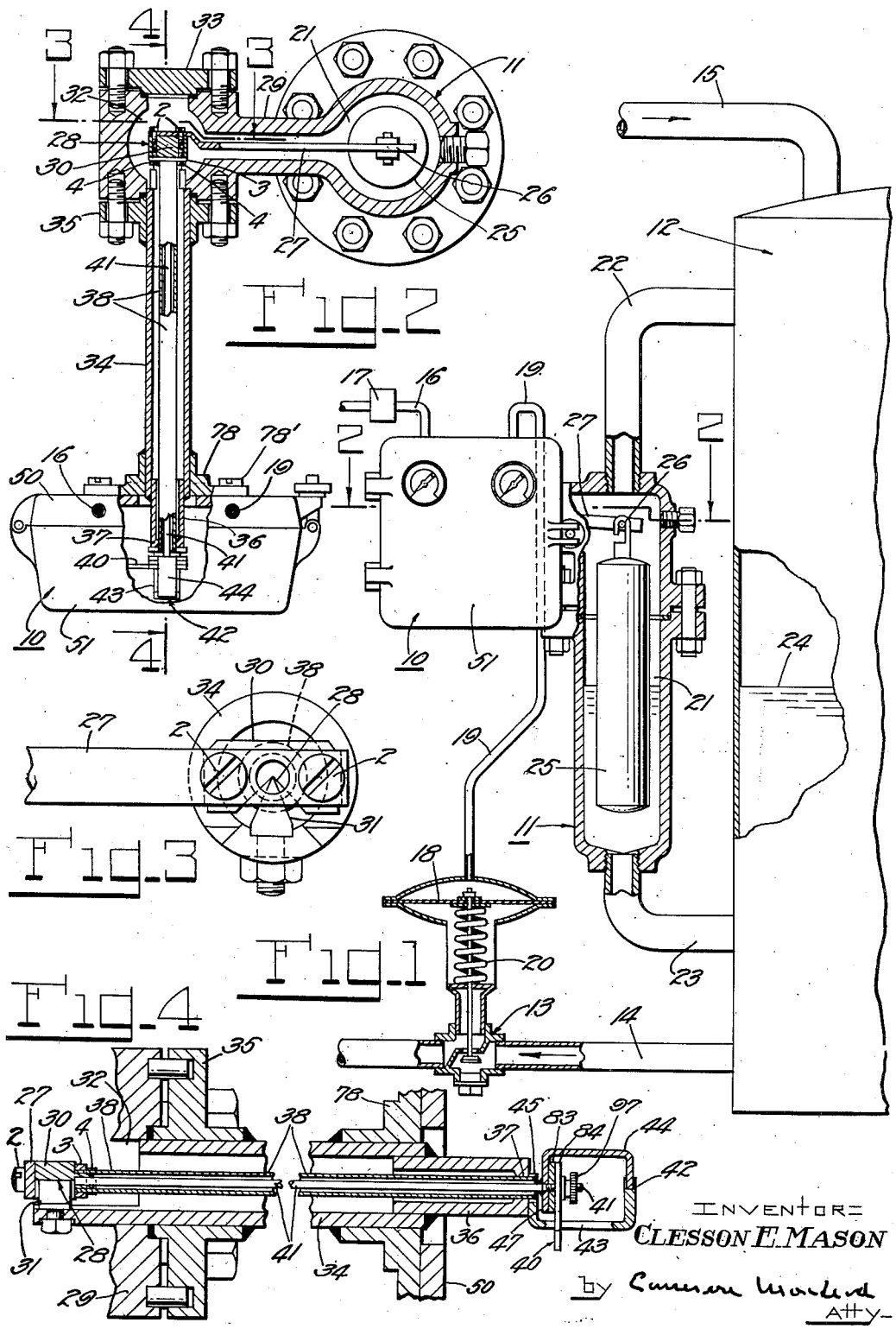
INVENTOR
CLESSON E. MASON
by Cameron Morland
Atty.

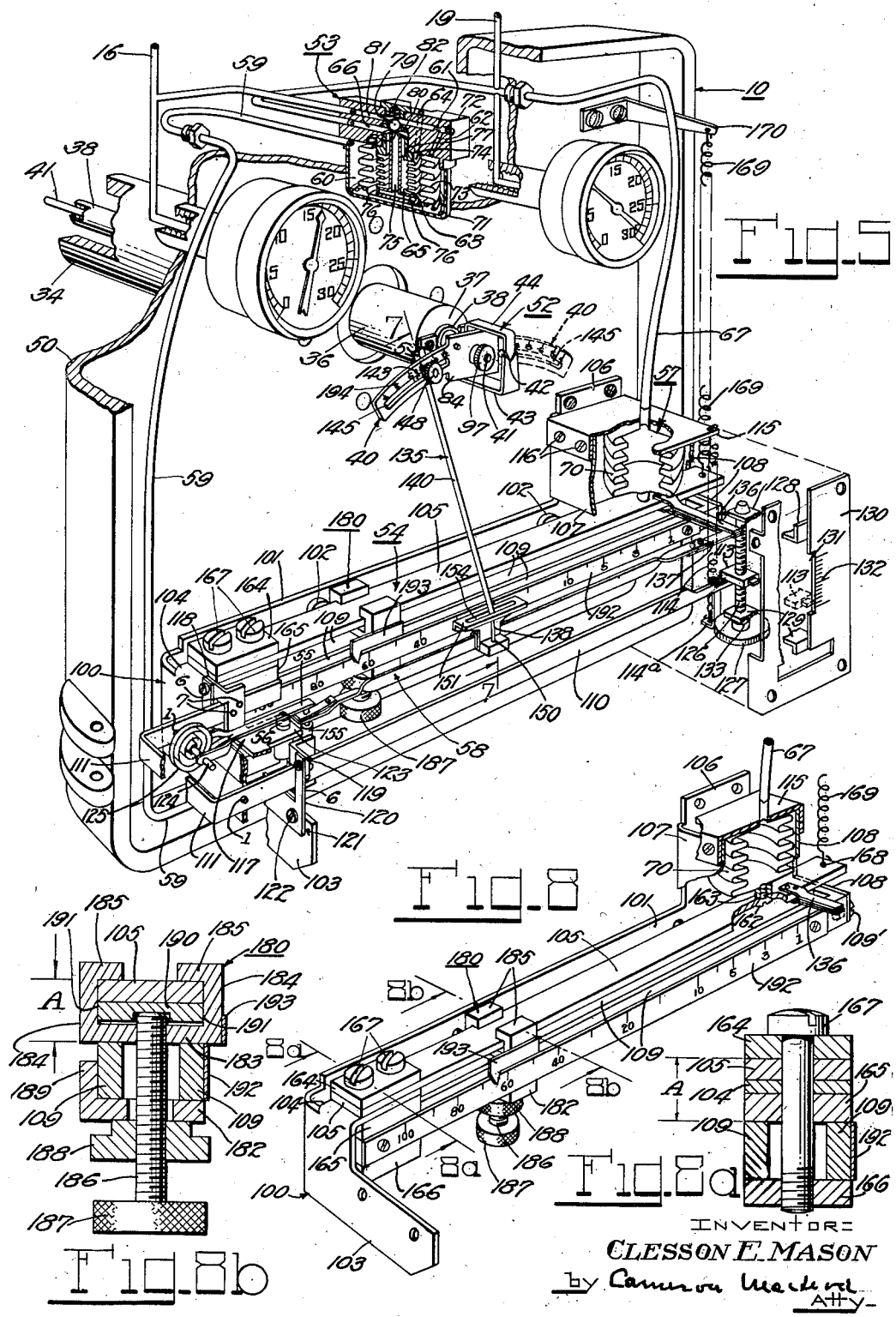

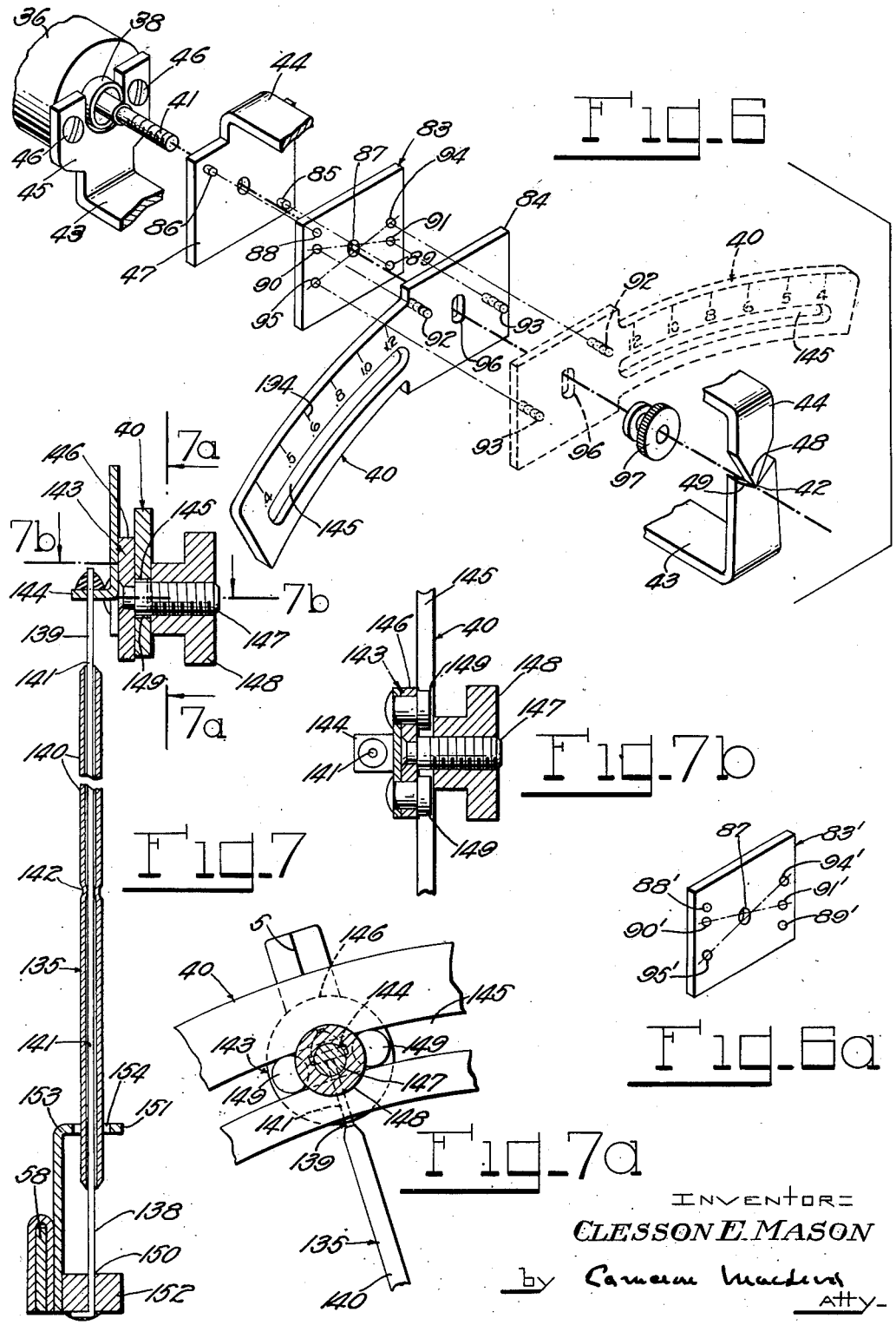

Nov. 4, 1952
C. E. MASON
2,616,440
PNEUMATIC CONTROL MECHANISM
Filed Aug. 3, 1944
5 Sheets-Sheet 4
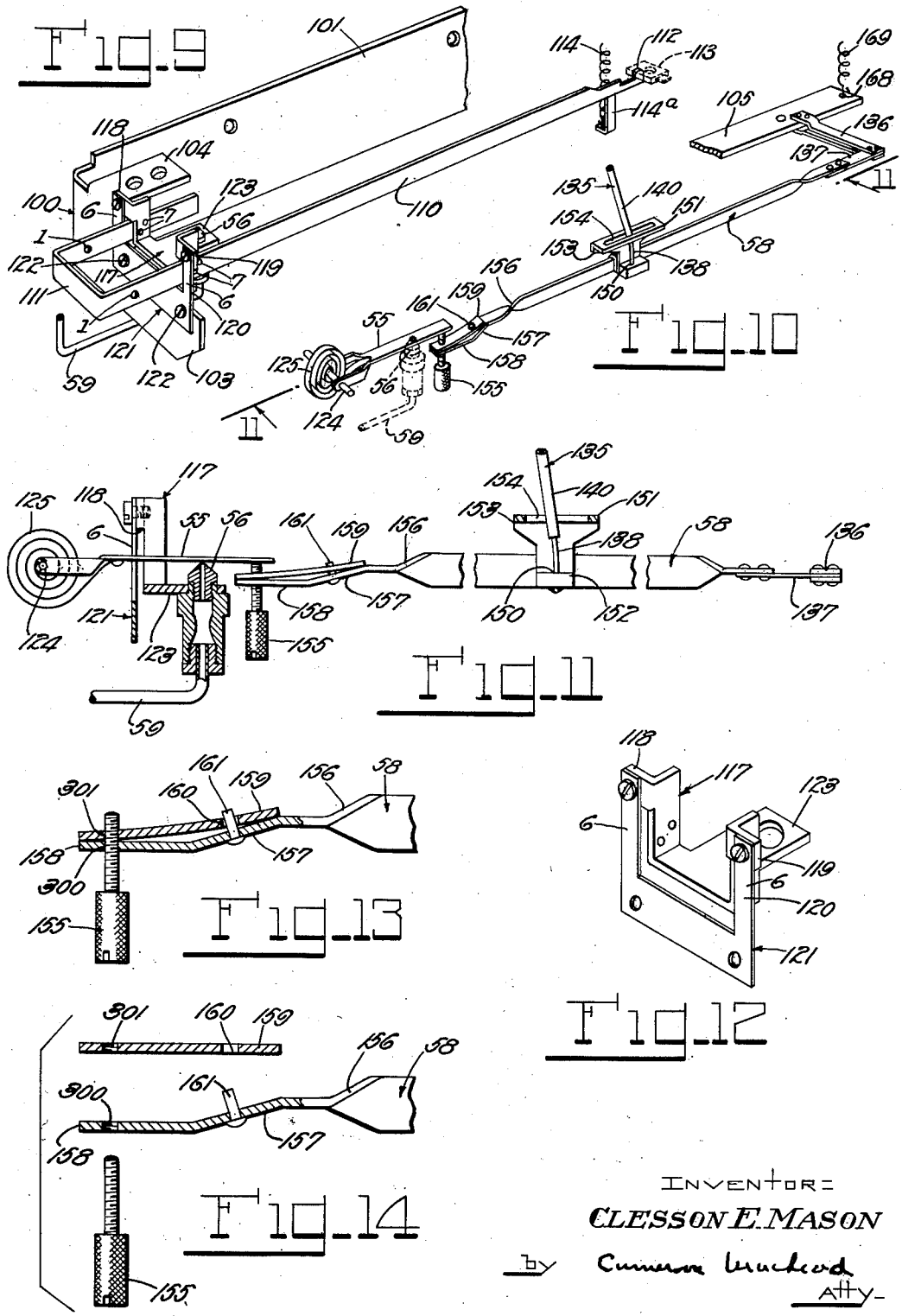
INVENTOR:
CLESSON E. MASON
by Cameron MacLeod
Atty.

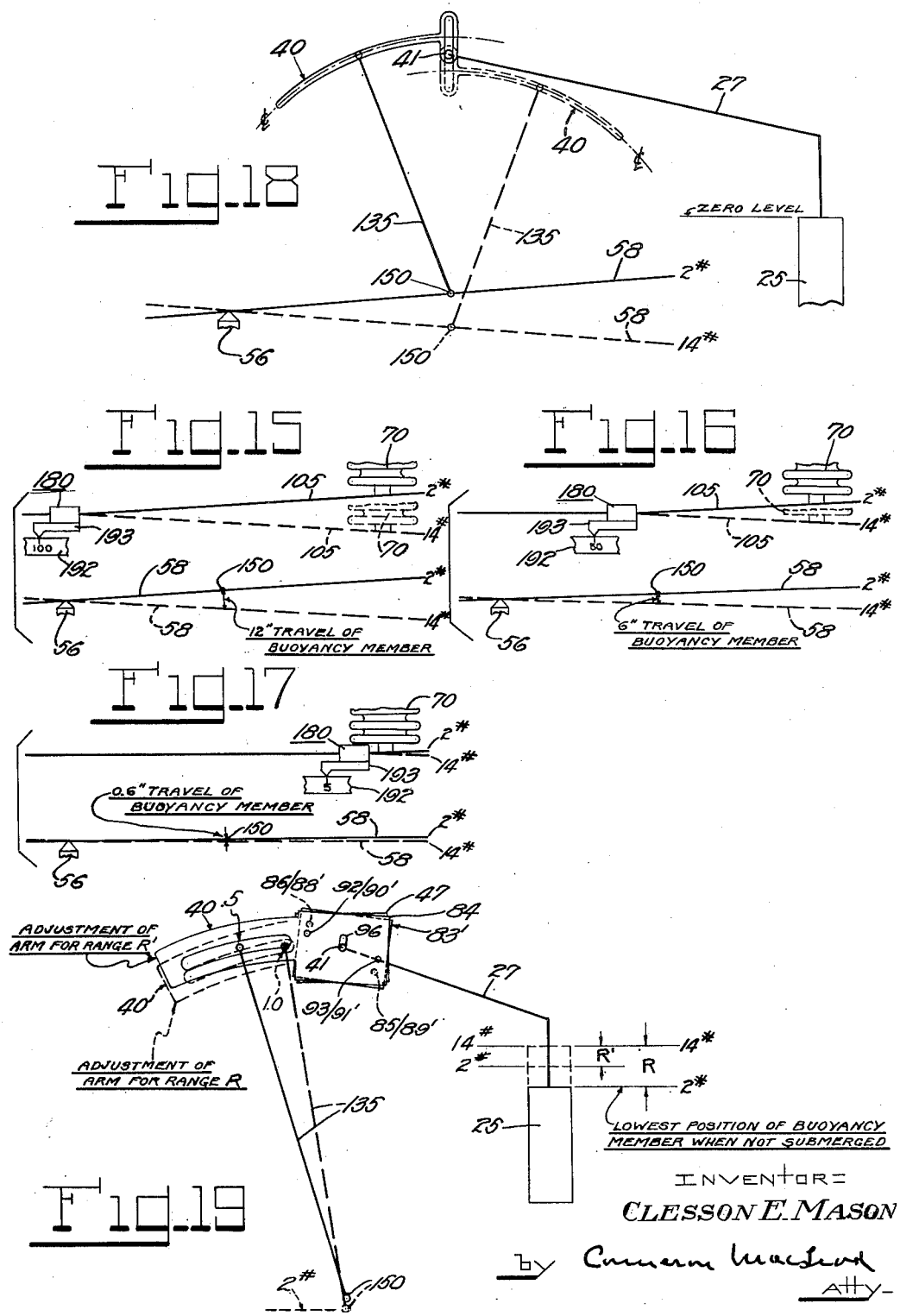

Patented Nov. 4, 1952

2,616,440

UNITED STATES PATENT OFFICE 2,616,440

PNEUMATIC CONTROL MECHANISM

Clesson E. Mason, Brookline, Mass., assignor to Mason-Neilan Regulator Company, Boston, Mass., a voluntary association of Massachusetts Application August 3, 1944, Serial No. 547,912

20 Claims. (Cl. 137—85)

This invention relates to controllers for maintaining a condition, such as pressure, temperature, level or the like at or substantially at a desired value by governing the rate of application of an agent for affecting the condition. More particularly, this invention is concerned with controllers wherein fluid pressure is utilized and varied to a pressure operated servomotor on a selected basis which variation is proportional to the change in the condition value, the controller herein disclosed being arranged and constructed for use in connection with a compressible operating fluid such as air or an equivalent medium.

Controllers with which this invention is primarily concerned may include a fluid system, the pressure in one part of which is governed preferably by a control couple actuated by a primary element responsive to a change in the value of the condition, and by a proportioning mechanism responsive to a change of pressure in another part of the fluid system, the construction and arrangement being such that adjustment of the throttling range or proportioning band of the controller is provided for stabilizing the control action under various operating conditions. And the improvement relating to this invention consists of novel means for affording an extremely sensitive response to changes in condition value, as measured by any well-known type of primary element suited to the purpose, combined with a new and improved arrangement and mode of operation for establishing and maintaining the degree of proportionality required by the operating conditions. Among other things, this invention specifically relates to means for providing a wide range of proportionality, including means by which an accurately graduated proportioning band scale may be provided wherein the scale graduations are not congested at either end and are generously spaced over a long scale without requiring the use of multiplying levers or multiplying mechanisms. Furthermore, the construction is such that minor and major changes in the adjustment of the width of the proportioning band do not disrupt the functional operation of the controller and also any desired value of the proportioning band, such as the mid value, may be made to remain substantially at the same position regardless of the width to which the proportioning band may be adjusted.

As is well-known to those skilled in the art, elements or devices initially responsive to changes in condition value embody various constructions, each suited to measure changes in the value of a particular condition and, therefore, such devices necessarily vary widely in the movement and power they are capable of producing for the purpose of operating a controller mechanism. While the movement and power afforded by some of these devices is ample for actuating modern controllers with reasonably accurate results, the proportional motions of other devices are so small that their movements must be highly multiplied to produce sufficient motion for many conventional types of controllers. These multiplications not only sacrifice power but introduce error and, because of the relatively large magnitude of motion necessary for these controllers, rotatable bearings must be used for lever motions; also in order to avoid lost motion, the bearings must be of a high degree of refinement. It is an object of this invention to provide a controller capable of being actuated directly by small proportional motions from the condition sensitive element with negligible power requirements and a controller in which the angular motions of levers or links are so small that it will be possible to eliminate rotatable bearings and thus eliminate their disadvantages. The construction herein disclosed permits utilizing a well-known type of leaf spring flexure to provide a limited swinging motion at all pivotal points normally required for the functional operation of such mechanism. The practical utilization of such form of flexure completely eliminates friction and lost motion.

Other conventional types of pneumatic proportioning mechanisms utilize small motion of the measuring element by virtue of force-balancing, but they are not applicable to many common types of small motion measuring elements and they are usually dynamically unstable because of the small motion and require some form of mechanical damping. It is also an object of this invention to provide a pneumatic proportioning mechanism which is dynamically stable as well as accurately responsive to extremely small motions when relatively wide ranges of proportionality are desired.

Fluid operated instruments usually employ some feed back mechanism, such as bellows or equivalent means, responsive to pressure changes in the fluid system of the controller, for the purpose of establishing a throttling range or proportioning band suited to the control operation, such devices being adapted to provide a predetermined response movement over a selected range of fluid pressure change, for example, a movement of the bellows of one quarter of an inch being produced by a pressure change from 2 lbs. to 14 lbs. And it has been customary to modify the effect of the proportioning bellows movement by some form of adjustable lever connections between the bellows and the control couple. In other words, it has been the practice to provide a bellows having a fixed over-all movement and to supply proportionality adjustments by multiplication or reduction of this motion. One difficulty of this method of providing proportionality is that it adds to the number of operating parts and pivotal connections and, therefore, increases the lost motion and/or friction factors; and another difficulty arises from this arrangement, namely, that the attainable range of proportionality adjustment is limited, for when a wide range of proportionality is desired, the adjustment becomes so critical at one end of the scale range that accurate graduations of the proportioning band scale are impossible. To overcome these difficulties, I provide a pneumatic proportioning device, preferably in the form of a bellows, having a direct communication with the control couple, combined with adjustment means for varying the over-all bellows movement in response to an over-all change in operating pressure. I thus avoid the use of additional parts required for the multiplication or reduction of motion and the disadvantages resulting therefrom.

It is still another object of this invention to provide a pneumatic controller which is capable of being produced on a quantity basis at reasonable cost without impairing its operation or requiring unusual skill in the manufacture and assembly of the parts. With this end in view, the parts directly connected with the measuring element may be attached to the instrument case and arranged as required for the particular primary element employed, and the pneumatic controller mechanism may be consolidated in one assembly frame adapted for attachment to the instrument case and arranged and constructed for production on a quantity basis in a manner to insure functional alignment. To take care of misalignment occasioned by individually mounting in the case, the parts associated with the measuring element and the parts associated with the control mechanism, I provide a novel link connection which does not require perfect alignment and which transmits extremely small motions without friction or lost motion. The novel link connection, just referred to not only compensates for normal misalignments but serves both as a means for relating the motion of the primary measuring element to the requirements of the pneumatic control mechanism and as means for reversing the control action in the field or for meeting other field requirements without altering the range of the controller or without requiring adjustments of any other parts.

These and other objects of this invention will be more fully understood from the following description when taken in connection with the accompanying drawings and the novel features thereof will be pointed out in the claims.

In the drawings:

Fig. 1 is a view, partly in diagram, showing a controller embodying this invention actuated by a proportioning liquid level responsive device for governing a fluid pressure operated valve for controlling the level of liquid in a pressure vessel.

Fig. 2 is a view partially in plan and partially in section on line 2—2 of Fig. 1 of the controller and liquid level proportioning device shown in said figure.

Figs. 3 and 4 are enlarged sections taken respectively on lines 3—3 and 4—4 of Fig. 2.

Fig. 5 is a view in perspective, partly broken away and partially in section, showing the organization and arrangement of the controller parts as mounted on the rear portion of an instrument case, certain of said parts being broken from the lower portion of the structure and seperated therefrom.

Fig. 6 is an enlarged perspective view of certain parts of the primary motion mechanism shown separately.

Fig. 6a is a perspective view of one of the parts of Fig. 6 for obtaining suppressed ranges.

Fig. 7 is a section taken on the line 7—7 of Fig. 5.

Figs. 7a and 7b are sections taken respectively on the line 7a—7a and 7b—7b of Fig. 7.

Fig. 8 is a perspective view, partly broken away and partly in section, of the proportioning band mechanism including its means for adjustment.

Figs. 8a and 8b are sections taken respectively on the lines 8a—8a and 8b—8b of Fig. 8.

Figs. 9 and 10 are perspective views of certain parts of the pneumatic control mechanism.

Fig. 11 is a view taken substantially on the line 11—11 of Fig. 10, certain parts of Fig. 9 being added thereto.

Fig. 12 is a perspective view of a partial assembly shown also in Fig. 9.

Figs. 13 and 14 are enlarged detailed views of a portion of Fig. 11, Fig. 14 showing the parts separated.

Figs. 15, 16 and 17 are diagrams illustrating the effect of various proportioning band adjustments.

Fig. 18 is a diagram illustrating the principles employed in obtaining reversal of the control action.

Fig. 19 is a view, partly in diagram, illustrating the principle employed in effecting suppressed ranges.

Having reference to the drawings, Fig. 1 illustrates a controller generally indicated at 10 embodying this invention applied to a proportioning level responsive device also generally indicated at 11 for governing the level of liquid in a pressure vessel 12 by means of a fluid pressure operated valve 13 regulating flow through a discharge pipe 14, the vessel being provided with an inlet pipe 15. The controller 10 may be supplied with operating fluid, such as air, through a pipe 16 from a source of fluid pressure, not shown, and the pressure may be maintained substantially constant by a suitable reducing valve indicated diagrammatically at 17. The control valve 13 is provided with a diaphragm 18, subjected on one side to output pressure from the controller 10 through a conduit 19 and on the other side to the force of a spring 20, the parts being arranged, as herein shown, so that proportionate increases of output pressure proportionately open the valve against the force exerted by the spring.

In order to illustrate a condition value responsive device of the type which affords relatively small, delicate movements for actuating the controller, the torque tube proportioning level device 11 is herein shown. It is provided with a chamber 21, connected at its upper and lower ends with the pressure vessel 12 by means of pipes 22 and 23, respectively, affording a fluid communication with the vessel at points above and below the desired liquid level herein illustrated at 24. Referring to Figs. 1, 2, 3 and 4, within the chamber 21 there is a cylindrical buoyancy member 25 which is adapted to sink in the liquid and is suspended on one end 26 of an arm 27 pivotally mounted at 28 (see particularly Fig 3) in a laterally extending housing 29. A suitable pivot may be in the form of a knife block 30 secured to the arm 27 by screws 2 (Figs. 2, 3 and 4) and adapted to cooperate with a knife edge member 31 rigidly supported in a housing chamber 32. The chamber 32 is closed at one side by a blank flange 33 and is in communication at the other side with a torque tube housing 34 of tubular shape detachably connected to the housing 29 by means of a flange 35. Near the other end of the housing 34, a flange 78 is welded to which the controller is mounted, as by screws 78'. At this end of the housing 34 and beyond the flange 78, the housing is reduced at 36 and provided with an end portion 37 (Figs. 2, 4 and 5) the reduced portion 36 being made integral with the housing by welding, and within the housing a torque tube 38 is axially disposed. One end of the torque tube is provided with a plate 3 which is secured to the knife block 30 by screws 4 (Figs. 2 and 4) and the other end extends through a central opening in the end portion 37, to the walls of which it is preferably secured by welding. The end portion 37 and torque tube 38 provide a pressure tight seal for the housing chamber 32 and at the same time the torque tube, being resilient in torsion, yieldingly resists through the arm 27 the downward force exerted by the buoyancy cylinder 25. When the cylinder 25 is not buoyed by liquid, the torque tube supports the buoyancy cylinder at a point just above the bottom of the chamber 21. As the level of liquid rises and liquid is displaced by the cylinder 25, the effective weight of the cylinder is decreased by an amount equal to the weight of the liquid displaced, thus producing a cylinder movement which is proportional to the change in submergence of the cylinder. For a given cylinder diameter the magnitude of the movement depends on the gravity of the liquid, the length of float arm 27 and the spring characteristic of the torque tube 38. In practice, the parts are usually constructed so that the knife block 30 rotates on the knife edge member 31 approximately four to six degrees for a change of liquid level between a point at which liquid is first displaced by the buoyancy cylinder to a point at which the cylinder is just submerged. While this rotation serves as an accurate measure of level change, it will be understood that when small increments of level change occur the movement and power available are extremely limited.

Rotation of the knife block 30 is transmitted to an arm 40, shown in Figs. 2, 4, 5 and 6, and thus to the mechanism of the controller 10 by means of a shaft 41 mounted axially of the torque tube 38. One end of the shaft 41 is welded to the plate 3 and the other end extends into the controller 10, being supported by a knife edge pivot 42. The pivote comprises a knife block 43 and a knife edge member 44. The knife edge block 43 is formed with an upturned mounting end 45 (see particularly Fig. 6) for connection with the end portion 37, as by screws 46, and the knife edge member 44 has a downturned end which is integral with a plate 47 shown most clearly in Figs. 4 and 6, which plate is mounted on the shaft 41 and preferably secured thereto by welding. The coacting parts of the knife edge and knife block members comprise a knife edge portion 48 and a V notch portion 49 which cooperate to provide the pivotal mounting 42 for the outer end of the shaft 41 substantially at the axis thereof.

While I have described in some detail one type of level responsive in connection with which the controller embodying my invention may be used, it will be understood that the controller may be combined with other types of liquid level response devices or with any condition sensitive element which is capable of generating even limited power and movement as a measure of condition value changes, such as changes in temperature, pressure, rate of flow or the like. The controller 10 may be mounted in any suitable case 50 having the usual hinged or detachable cover 51 all as shown in Figs. 1 and 2 and the case may be adapted for mounting on the liquid level responsive device 11, herein illustrated, or on a wall or other support when used with other types of condition sensitive elements.

Referring to Fig. 5, the control mechanism in general comprises a primary movement 52 responsive to liquid level changes, for example, a fluid pressure system including a pilot valve 53 which is operated by a primary pressure and governs a secondary pressure which is the output pressure of the controller, and a pneumatic control mechanism 54 which is actuated by the primary movement 52 and by the output pressure. The pneumatic control mechanism includes a proportioning device 57 comprising a bellows 70 and associated mechanism, a control couple consisting of a nozzle 56 and a baffle 55 for governing the primary pressure, and a baffle operating lever 58 which is actuated jointly by the primary movement 52 and by said proportioning device. The nozzle 56 may be connected with the pilot valve 53 by means of a fluid line 59 which constitutes one part of the pressure system.

The pilot valve 53 may be of any usual construction, such as shown in the U. S. Patent to Hubley No. 2,327,898, dated August 14, 1943. The pilot valve 53 includes a pressure chamber 60, in connection with the line 59, an exhaust chamber 63, in communication with the atmosphere through a port 64, and a pressure chamber 65 in communication with a fluid passage 66 which, in turn, connects both with the fluid conduit 19, leading to the control valve diaphragm chamber above the diaphragm 18 (Fig. 1), and with a pipe 67 which communicates this pressure to the bellows 70 forming a part of the pneumatic proportioning device. The pilot valve chambers 60, 63 and 65 are included in a case 71 attached to a pilot valve block 72. These chambers are defined as follows: chamber 60, by the case 71 and an outer bellows 73; chamber 63, by the outer bellows 73 and an inner bellows 74; and chamber 65, by the inner bellows 74 and the wall of a tube 75 mounted within the bellows. The inner passage of tube 75 serves as an exhaust tube which communicates through ports 76 with the exhaust chamber 63. The tube is connected with the free ends of bellows 73 and 74 and is adapted to be moved in a gland or bushing 77 by means of the said bellows. The upper end of the tube 75 is reduced and at the end forms a valve seat 8 which coacts with a ball valve 79 to provide an exhaust valve. The ball valve 79 cooperates with a fixed seat 80 in the pilot valve block 72 to form a supply valve, and the reduced end of the tube 75 is adapted to enter the port defined by the seat 80 when the supply valve is opened by the action of the bellows 73 and 74. The supply valve is located in an inlet chamber 81 supplied with air under pressure, preferably at 16 to 18 lbs., by the supply pipe 16. The ball valve 79 is urged downwardly, that is towards the seat 80, by a small spring 82 which operates normally to close off the supply valve. Air is supplied from the inlet chamber 81 through a restriction 61 and port 62 to the chamber 60 whence it passes through the line 59 to the nozzle 56, as explained above. The nozzle orifice, when unrestricted, has more capacity than the restriction 61 so that the pressure in chamber 60 is governed by the relative positions or the baffle 55 and the nozzle 56.

In operation increasing pressures in chamber 60 tend to open the supply valve and thus build up pressures in passage 66 and in chamber 65. In this construction, the effective area of bellows 73 is considerably greater than the effective area of bellows 74. Also forces exerted by pressures in chamber 65 oppose forces exerted by the pressures in chamber 60 so that when the pressure in chamber 65 exerts a force greater than the force exerted by the lower pressure in chamber 60, the tube 75 is permitted to move downward thus allowing the supply valve to close. Pressures in chamber 65 in excess of that required to balance the force exerted by the pressure in chamber 60 will continue to move tube 75 downward and thus open the exhaust port formed by the end of tube 75 and ball valve 79 thereby exhausting the pressure in passage 66 and chamber 65 to that pressure which just balances the force exerted by the pressure in chamber 60. By these combined actions the discharge pressure of the pilot valve, that is, the pressure existing in the diaphragm chamber of the valve 13 (Fig. 1) and in the proportioning bellows 70, is varied by changes in pressure in chamber 60. The pressure in chamber 60 is in turn varied, for governing the output pressure in a manner to be described, by the reactions of the control couple comprising the baffle 55 and nozzle 56.

Referring to the primary movement 52, the shaft 41 is adapted to rotate the arm 40, which is arc shaped for reasons hereinafter to be set forth, and may be attached either to the left or right hand positions shown in full lines and dotted lines respectively in Fig. 5, to provide for reversing the control action in a manner to be described. The attachment means for the arm 40 are more clearly shown in Fig. 6 and are so constructed that in addition to providing for reversing the control action they provide for establishing the proper relationship of the arc shaped arm with any desired high or low limit of any type of measuring element. The attachment means comprise the mounting plate 47, which is integral with the knife edge member 44, an adapter plate 83, and an arm plate 84 which is an integral part of the arm 40. The shaft 41, which is secured to the plate 47 by welding as described above, extends through said plate (see particularly Fig. 4) and the end of the shaft is threaded. The plate 47 contains positioning pins 85 and 86. Adapter plate 83 has a central hole 87 through which the end of the shaft 41 extends in assembly and is also provided with holes 88 and 89 which are adapted to receive the pins 86 and 85 and which are located so as to establish the desired angular relationship between plates 83 and 47. In addition, the plate 83 contains a pair of holes 90 and 91 which are adapted to receive the rearwardly projecting ends of a corresponding pair of through pins 92 and 93 with which the plate 83 is provided and as indicated by the projected dotted lines. The pair of holes just referred to are located so as to position the arc of the arm 40 in proper relationship to the pivot point when the arm 40 is mounted on the left as shown in full lines.

The plate 83 also has a pair of holes 94 and 95 which are adapted to receive in the same manner the rearwardly projecting ends of the through pins 92 and 93 as indicated by the projected dotted lines, when the arm 40 is mounted on the right of the pivot point 42 as shown by the dotted line position of said arm. The arm plate 84 has an elongated opening 96 through which the end of the shaft 41 may extend in assembly. For reasons hereinafter to be described, the elongated opening 96 provides for permitting the arc to be positioned above or below the pivot point 42 for the left or right hand mountings and the pins 92 and 93 are spaced radially from the center of the elongated opening so that the shaft 41, which extends through the said opening, permits the parts to be assembled only with the pins in the correct pair of holes. When the plates 83 and 84 are assembled on the plate 47, they are secured in position by a thumb nut 97 threaded onto the projecting end of the shaft 41. Fig. 6a shows an adapter plate 83' in which the holes 88'—89' and 90'—91' have a different angular arrangement from that of the holes 88—89 and 90—91 in the adapter plate 83 with which they correspond. The use of the plate 83' will be hereinafter described.

Referring to Fig. 5 rotation of the arc shaped arm 40 transmits motion to the pneumatic control mechanism 54 which is included in one assembly unit mounted in a frame 100 constructed to provide suitable mountings for the functional parts. The frame 100 (see also Figs. 8 and 9) generally includes a back portion 101 which is secured to the back of the case 50 by screws, some of which are indicated by the numerals 102; a forwardly projecting portion 103 for mounting the control couple and parts immediately associated therewith; an ear 104 for mounting a cantilever leaf spring 105, the function of which will be described later; and an upwardly projecting portion 106 having forwardly projecting ears 107 and 108 for mounting and partially housing the proportioning bellows 70, ear 108 being also employed to secure one end of each of a pair of slide bars 109, as by screws one of which is indicated at 109' in Fig. 8. The slide bars 109 which are shown in transverse section in Figs. 8a and 8b, also serve as a rigid support for an adjustable fulcrum for the cantilever leaf spring 105.

The operating parts of the pneumatic control mechanism 54 include the nozzle 56 and baffle 55, referred to above, which vary the pressure in the nozzle line 59 and primary chamber 60 of the pilot valve 53. The nozzle 56 and baffle 55 are both rigidly attached to a control point setting arm 110 formed at one end in the shape of a U-bend 111 and provided at the other end with an end portion 112 for engagement with the lower surface of a setting index nut 113, to be described, against which it is held by a spring 114. The spring 114 is connected at one end to a bracket 114a (Figs. 5 and 9) depending from the arm 110, and at the other end to a cover 115 which is detachably secured by screws 116 to the projecting members 107 and 108. Within the U of the U-shaped bend 111, and attached thereto as by rivets 7, there is another U-shaped member 117 (see also Fig. 12) disposed at right angles to the plane of the U-member 111 and having outwardly extending ears 118 and 119 which project beyond the sides of the U-shaped member 111. The ears 118 and 119 of the U-shaped member 117 are attached to the upper ends of a pair of vertically disposed leafs 6—6 forming a flexure pivot 120 of a spring member 121 the base of which is attached, as by screws 122, to the frame portion 103. This construction provides a pivot for the member 117 and the arm 110 in the form of a leaf spring flexure which is not only frictionless to the small angular motions required, but, within the limits of these motions, the flexure member is rigid in directions at right angles to the axis of the arm 110, and therefore constitutes an effective pivot completely free of lost motion.

The nozzle 56 is rigidly mounted on a projection 123 of the U-member 117 and is connected with the nozzle line 59 which has sufficient flexibility to permit the nozzle to be oscillated with the setting arm 110 around the flexure pivot 120. The baffle 55 may consist of a flat strip of stainless steel forked at one end and journaled on a shaft 124 which extends across the U-shaped portion 111 of said setting arm and is secured in holes 1—1 therein (Figs. 5 and 9). The baffle 55 is laterally positioned by means of its forked ends and is urged by a light hair spring 125 towards the discharge orifice of the nozzle 56. By this mounting of the nozzle and that of the shaft for the baffle, the nozzle-baffle assembly becomes a unit which is rotatable with the control setting arm 110.

The setting index nut 113, referred to above, is threaded on a vertically disposed screw 126 having a hand knob 127 at its lower end. The screw 126 extends through top and bottom guides 128 and 129 respectively, in the form of tabs, which may be an integral part of a front cover 130 of the proportioning bellows housing. The front cover is provided with a sight opening 131 for the index nut 113, said opening being preferably edged by a scale 132 to indicate the control point setting. The lower end of the screw 126 is enlarged to form a shoulder 133 which bears against bottom guide 129. The nut 113 is square and its corners bear against the cover plate 130 and therefore may be raised or lowered by turning the screw 126. By this means combined with the spring 114, the arm 110 may be rotated about the spring flexure 120 through a small angle thus rotating the nozzle-baffle assembly and raising or lowering the nozzle a proportionate amount for establishing a control point setting as indicated on the scale 132. This is an important feature of the invention for it not only assures a permanent relationship between the plane of the baffle and the plane of the nozzle orifice for various control point settings, but it provides a control point setting means which is extremely responsive to small adjustments and permits accurate graduations in the scale 132. In actual practice, it has been found to be positively and accurately responsive to adjustments of less than one one-thousandths of the maximum range of adjustment or adjustments which change the position of the nozzle less than one ten-thousandths of an inch.

The baffle lever 58 functions as a means whereby the baffle 55 is operated jointly by the arm 40, referred to above, and by the proportioning device 57, to be described. For this purpose, the lever 58 is connected to the arm 40 by a link 135 and is also pivotally connected to an arm 136 which is rigidly mounted on and projects laterally from the cantilever leaf spring 105 at a location near its free end. This construction forms one part of the proportioning device. The pivotal connection with the arm 136 consists of a spring-leaf flexure 137 rigidly attached to the lever 58 at one end and to the arm 136 at the other end. The lever 58 is preferably mounted to be oscillatable in a plane which is substantially coincidental with the plane of oscillation of the arm 40, but inasmuch as the plane of oscillation permitted by the spring-leaf pivot 137 is determined by the spring mounting, and the plane of oscillation of the arm 40 is also determined by its individual mounting, the production and assembly of the controller may at times result in some degree of misalignment of the arm 40 and lever 58. To accommodate for such misalignment without interfering with the freedom of movement of these parts and, at the same time, to avoid the lost motion and friction inherent in any mechanical type of bearing or pivot (see particularly Fig. 7) the link 135 is provided with spring-wire flexures 138 and 139 which connect it with the lever 58 and arm 40 respectively. Since the mounting of the spring-leaf flexure 137 is also used to align the free end of the lever 58 with the baffle 55, any discrepancies in alignment between the arm 40 and the lever 58 are compensated for by the spring-wire flexures 138 and 139 and thus even minute motions of the arm 40 are freely transmitted to the lever 58.

The link 135 is best illustrated in Fig. 7 and comprises a tube 140, which may be on the order of stainless steel capillary tubing, into which a spring wire 141 is inserted with the ends projecting from the tube to provide the spring-wire flexures 138 and 139 referred to above. The tube fits snugly around the wire and serves to provide rigidity to the major portion of the link so that flexion occurs only adjacent to the link connections. Means for positioning the tube on the wire may be in the form of a crimped portion 142, preferably intermediate the tube ends so that the wire is not distorted near its flexing portions.

Referring to Figs. 7, 7a and 7b, the flexible end 139 of the link 135 is connected with the arm 40 by means of a detachable clamp 143 having a projection 144 through which the wire extends and to which it is secured, as by solder. The clamp 143 is slidable in the arc shaped slot 145 of the arm 40 and is so constructed that the axis of the wire is normally at right angles to the tangent of the arc of the slot when the clamp is secured at various positions along the arc of the arm 40. For this purpose the clamp comprises a base 146 which has a member 147 extending through the slot 145 on which a thumb nut 148 is threaded for securing the clamp to the arm at various selected positions. The axis of the wire may be maintained substantially at right angles to the tangent of the arc by pins 149 suitably attached to the base 146 of the clamp and adapted to make a sliding fit with the arc shaped slot 145. An index mark 5 inscribed on a portion of the clamp 143 extending above the arm 40 (see Figs. 5 and 7a) assists in locating said clamp and consequently the link 135 with respect to the scale 194 on said arm.

The flexible end 138 of the link 135 (see also Figs. 5, 10 and 11) is connected at 150 with the lever 58 by means of a bracket 151 secured to the lever and having a projection 152 through which the wire extends and to which it is secured by solder. For reasons to be set forth, the bracket 151 is secured to the lever 58 and positioned so that the connection 150 is at the center of curvature of the arc of the arm 40 when the arm is in the position corresponding to zero level of liquid in the chamber 21 of the liquid level response unit 11, shown in Fig. 1. The upper portion of the bracket is provided with a horizontally disposed lip 153 containing a guide slot 154 through which the rigid tubular portion 140 of the link 135 extends. The link does not contact the walls of the slot 154 in operation, but the guide lip 153 serves to prevent distortion of the wire flexure 138 when the upper end of the link is detached from the arm 40 for adjustment or assembly.

The free end of the lever 58 is in operative connection with the baffle 55 by means of an adjustment screw 155 and associated parts shown in Figs. 5, 10, 11, 13 and 14. The major portion of said lever is in a vertical plane but it is twisted and offset at 156 to form a downwardly inclined portion 157 so that the end 158 may be bent into a horizontal plane which is below the longitudinal axis of the main portion of the lever and is parallel thereto. The free end 158 is drilled and tapped at right angles to the plane of its surface, as indicated at 300 in Fig. 14, to receive the adjustment screw 155. Means for locking the screw 155 consists of a flat spring strip 159 which has been similarly drilled and tapped at right angles to the plane of its surface near one end as indicated at 301. Said strip 159 is provided with a slotted hole 160 intermediate its ends, which cooperates with a pin 161 fixedly mounted preferably in the portion 157. In assembling the parts, the spring strip 159 may be placed over the pin 161 on the upper surface of the lever 58 as shown and flexed by pressing it against the surface of the lever so that the screw 155 may be threaded through its tapped opening just described. When the pressure thus applied for assembling the spring 159 is released the tension of the spring in tending to misalign the two tapped openings wedges the screw 155, and the spring tension applies a continuous wedging friction which is unaffected by wear and permits even minute adjustments without any possible accumulation of lost motion. Furthermore, the construction is simple and inexpensive to produce since a flat leaf strip is used and no special bending or shaping is required.

In pneumatic operation, the shaft 41 of the liquid level response unit 11 is actuated by the buoyancy member 25 in proportionate response to a change in liquid level which would tend to lower or raise the lever 58 about the spring-leaf flexure pivot 137 and thus cause the baffle 55 to cover or uncover the nozzle 56. By this means, a change of pressure in the nozzle line 59 is initiated, which change reacts, through the pilot valve 53, to vary the pilot valve output pressure in the manner hereinabove described. However, a change in pilot valve output pressure is immediately communicated to the proportioning bellows 70 through the pipe 67 and the tendency of the motion of the buoyancy element 25 to cover or uncover the nozzle 56 is arrested by the reaction of the bellows 70 in a manner to be described.

The proportioning device is more clearly shown in Fig. 8 and includes the bellows 70 which is rigidly attached to the cover plate 115 which is, in turn, secured to the forwardly projecting ears 107 and 108 of the frame 100, as described above, and the pipe 67 extends through this stationary end of the bellows and communicates with its sealed interior. The opposite or free end of the bellows is rigidly attached to the cantilever leaf spring 105 at a point near its free end, as by a screw 162 extending through the spring and threaded into a post 163 which is a part of the free end of the bellows. The other end of the leaf spring 105 (see also Fig. 8a) is attached to the frame 100 by clamping the spring and ear 104 between blocks 164 and 165. This mounting for the leaf spring is made rigid by also clamping the slide bars 109 between the block 165 and a block 166, all of these parts being clamped together by screws 167 which are threaded into the block 166 and extend through the remaining parts of the assembly. At the free end of the cantilever spring 105, beyond the bellows 70, there is attached at 168 one end of a spiral spring 169. The other end of spring 169 is supported by a bracket 170 rigidly mounted on the back of the case 50 on which the frame 100 is also mounted.

In order to explain the functional operation of the parts, hereinabove described, for the purpose of obtaining pneumatic proportionality, it will be desirable to assume certain adjustments and conditions. The functional operations will be easily followed by general reference to Fig. 5 and to Figs. 9, 10 and 11 for details. I will assume that the controller will operate with a proportioning band equal to 12 inches of level change. With a maximum level range of 12 inches, this adjustment is commonly referred to as 100%. I will neglect the effect of parts, to be described, used for adjusting the width of the proportioning band to ranges other than 12 inches. For simplicity, I will assume that the setting adjustment screw 126 is adjusted to position the index nut 113 in its mid position so that the arm 110 positions the nozzle 56 at the mid value of the setting adjustment range. Because of the fact that the proportioning band is 12 inches, the minimum or zero liquid level represents one end of the proportioning band and the high value of the level range represents the other limit of the proportioning band. With the arm 40 mounted on the left hand side of the torque tube shaft 41, and with the buoyancy member 25 mounted to the right of the controller 10, as shown in Fig. 1, an increase in liquid level will rotate the arm 40 in a counterclockwise direction which, in pneumatic operation, will tend to permit the baffle 55 to cover the nozzle 56 which, as explained above, will tend to increase the output pressure of the controller and thus will increase the pressure in the bellows 70. On the other hand, a decrease in liquid level will tend to decrease the output pressure of the controller and, therefore, will reduce the pressure in bellows 70.

The initial tension existing in spring 169 is just sufficient to oppose a downward force exerted by a mid value of output pressure in bellows 70, which pressure I will assume to be 8 lbs. per square inch and to be the mid value between the pressures of 2 lbs. and 14 lbs. which is an operating range of 12 lbs. Thus, when the downward force exerted on the cantilever spring 105 by a pressure of 8 lbs. in the bellows 70 is balanced by the upward force of the spring 169, the cantilever spring 105 stands in its neutral position and is not distorted in either direction. Therefore, when an 8 lb. pressure exists in bellows 70, the arm 136, which is attached to the cantilever spring 105, positions the spring flexure 137 of the baffle operating lever 58 at its mid position.

I will assume that the liquid, to which the buoyancy member 25 responds, is water and that the thumb nut 148 attaches the upper end of the link 135 at the point along the arc of the arm 40 which corresponds to 1.0 specific gravity. I will assume further that when the buoyancy member 25 is at the mid value of its operating range, and the pressure in bellows 70 is equal to 8 lbs., the micrometer screw 155 on the free end of the lever 58 is so adjusted that the upper end of the screw 155 positions the baffle 55 to be within the operating range with respect to the nozzle 56.

In explaining the reactions of pneumatic proportionality, it is convenient to assume that the liquid is at the mid value of the level range which, in this case, would be 6 inches above zero level, and to observe the relation of parts when there is no operating air supplied to the controller. Under these conditions and with the adjustments assumed above, there would be atmospheric pressure in bellows 70 and the initial tension in the spring 169 will pull the free end of the cantilever spring 105 to its uppermost position. The leaf spring flexure 137 is also in its uppermost position. Since the arm 40 is at its mid position, due to the liquid level being at its mid position, the uppermost position of the leaf spring flexure 137 causes the baffle operating lever 58 to be rotated around the spring wire flexure connection 150 of the link 135 and thereby causes the end of the screw 155 to be lowered so that it does not contact the baffle 55. Thus, the baffle covers the orifice of the nozzle 56. If supply air is now turned on to the controller, air pressure will build up at a maximum rate in the discharge connections of the pilot valve 53 and therefore in the bellows 70, as previously explained, due to the fact that the baffle 55 momentarily completely closes the nozzle 56. As the pressure builds up in bellows 70, the spring leaf flexure 137 is lowered and this motion causes the baffle operating lever 58 to rotate about the wire connection 150, thus raising the left hand end of the lever and causing the end of the screw 155 to approach the baffle. Under the conditions assumed above, when the pressure in bellows 70 reaches the value of 8 lbs. per square inch, the end of the screw 155 has just contacted the baffle 55 and slightly opened the nozzle orifice. This permits the pressure in nozzle line 59 to drop to that value within the operating range which is necessary to throttle the pressure in bellows 70 at 8 lbs. Thus, the output pressure of the controller is prevented from increasing above that value which will cause the baffle operating lever 58, which rotates around spring wire flexure 138 as a pivot, to throttle the escape of air in the nozzle 56 and maintains a static balance with the output pressure constant and at the mid value of the pressure range when the liquid level is at the mid value of the limits of the proportioning band.

With the pneumatic proportionality now in static balance, I may assume, for the purpose of explaining the operation following a change in level, that the level of liquid in chamber 21 drops 1 inch, for example. As this occurs, arm 40 is rotated in a clockwise direction and an upward motion is transmitted to the baffle operating lever 58 through the link 135. This motion would tend to uncover the nozzle 56 with the result that the discharge pressure of the pilot valve 53 would drop and the pressure in bellows 70 would decrease by the same amount. However, this reduction of pressure in bellows 70 would permit the spring 169 to flex the free end of the cantilever spring 105 upward a proportional amount and thus raise the spring leaf flexure 137. This upward motion of the spring flexure 137 will rotate the lever 58 around the spring wire flexure 138, which now stands in a slightly higher position, and will arrest the tendency for the motion of arm 40 to uncover the nozzle. Thus, the baffle operating lever again throttles the pressure in line 59 so as to reduce the pressure in the bellows 70 and maintain the output pressure of the controller at a new reduced value. Now since the assumed level change of 1 inch is one-twelfth of the proportioning band, the output pressure change is one-twelfth of the output pressure range of 12 lbs. and when the level dropped from 6 inches to 5 inches, the output pressure changed from 8 lbs. to 7 lbs. Therefore, the change of pressure is exactly the same as the change in level and this proportionality will be maintained for any magnitude of level change within the proportioning band as, for example, a level change of one-tenth inch will produce a pressure change of one-tenth of one-pound. Also, with this 100% proportioning band, a 12 inch level change would produce a 12 lb. output pressure change. These motions are diagrammatically illustrated in Fig. 15. Conversely, if the liquid level increases, opposite motions and reactions occur and the baffle lever 58 tends to cause the baffle to cover the nozzle but the resulting increase of pressure in the bellows 70 flexes the end of the cantilever spring downward which by thus lowering the leaf spring flexure 137, arrests this tendency of the baffle to cover the nozzle and a new static balance is obtained with an increased pressure, which increase in pressure is exactly proportional to the increase in liquid level.

Referring to the means for adjusting the proportioning band, which is made possible by the construction disclosed, I provide a clamping mechanism generally indicated at 180 in Fig. 5 and shown in sectional detail in Fig. 8b. The mechanism is mounted on the horizontally disposed parallel slide bars 109, preferably rectangular in cross section, which are rigidly mounted directly beneath the cantilever spring 105 in the manner explained above and with the planes of their top and bottom surfaces parallel with the planes of the flat surfaces of the cantilever spring when the spring is in its neutral or undistorted position as is best shown in Fig. 8. The slide bars 109 serve as a track for the clamping mechanism 180 and also function to rigidly position the clamping blocks 164, 165 and 166 so that the mounting end of the cantilever spring remains stationary and does not yield to forces occasioned by the deflection of the free end of the spring above and below its neutral or mid position. The mechanism 180 includes a bottom member 182 in the form of a plate and a spacer member including a base 183, upstanding legs 184 and inturned clamping lips 185 formed so that the under surface of the lips 185 and the under surface of the base 183 are flat and parallel with each other. A clamping screw 186, having a knurled hand knob 187 and a knurled locking nut 188, extends freely through an opening in the plate 182 and is threaded into the base 183 of the spacer. The plate 182 may be prevented from turning with screw 186 or the locknut 188 by having an upturned end 189 which bears against a side of the slide bar 109 which is mounted at the rear of the controller. The slide bars 109 extend between the plate 182 and the spacer base 183, and the cantilever spring 105 is disposed between the clamping lips 185 and a clamping shoe 190 against which the upper end of the screw 186 bears. As herein shown, the clamping shoe 190 is recessed to receive the upper end of the clamping screw 186 and is arranged so that two edges 191 are in sliding engagement with the spacer legs 184 which serve to prevent it from rotating with the screw. By this construction, the screw 186 may be turned up to force the shoe 190 against the bottom of the cantilever spring 105 and thus operates to rigidly clamp the leaf spring against the under face of the inturned lips 185. The locknut 188 may then be turned up against the bottom plate 182 to clamp the under surface of the spacer base 183 against the upper surfaces of the slide bars 109. By these adjustments, that portion of the cantilever spring 105 at which the clamping is affected is rigidly locked in position.

A rigid clamping of the cantilever spring 105 at some position along its length, by the means just described, serves to determine the effective length of the spring. Positioning the clamping mechanism 180 towards the free end of the spring reduces the amount of deflection per unit change of pressure in bellows 70, and clamping the mechanism at positions further from the free end of the spring permits greater deflection per unit change of pressure. The thickness of the spring mounting block 166 plus the combined thicknesses of the ear 104 and the cantilever spring 105 indicated by dimension A (Fig. 8a) is made equal to the dimension A (Fig. 8b), which is the distance between the under surfaces of the lips 185 and the under surface of the base 183 of the spacer member. Therefore, when the cantilever spring 105 is in its neutral or undistorted position, adjustment and locking of the clamping mechanism 180 at any location along the spring does not distort the spring from its neutral position. By this construction, the deflection characteristics of the cantilever spring may be adjusted through an extremely wide range; also the relative deflection of the spring for a change in force exerted by a unit change in pressure in bellows 70 may be accurately indicated by the position of the clamp along the spring. For convenience of adjustment, I provide a scale plate 192 on the front surface of the slide bar 109 which is mounted forwardly in the controller and provide the plate with a scale including graduations from "1" to "100" which represent various widths of proportioning bands in terms of percentage of maximum. A suitable indicator 193 on the clamping mechanism 180 is adapted to cooperate with the scale.

In the operation described above, wherein a 100% proportioning band was referred to for the purpose of illustration, the clamping mechanism 180 would be set and clamped at graduation 100 as illustrated by the diagram in Fig. 15. However, should it be desirable to provide a 50% proportioning band for example, the adjustment is clamped at graduation 50 on the scale as indicated diagrammatically in Fig. 16. When in this position, the deflection characteristics of the cantilever spring per unit of pressure change in bellows 70, is reduced to one-half the value which was used in describing the 100% proportioning band. Thus, the force exerted by the bellows 70 must be twice as great in order to lower the right hand end of the lever 58 the same amount. Therefore, if the level drops 0.1 inch, as referred to in the previous description, the pressure change in bellows 70 must be twice as great as previously required or 0.2 lb., and it would then take only 0.05 inch of level change to produce the original 0.1 lb. change in pressure. With this new relationship between level change and output pressure change, it would require a 6 inch level change only to produce a 12 lbs. change in output pressure (see Fig. 16), that is, under the original condition of 6 inches of level giving 8 lbs. output pressure, a level change from 3 inches to 9 inches would produce an output pressure change from 2 lbs. to 14 lbs.

Again, if the clamping mechanism 180 is clamped sufficiently close to the free end of the spring 105 so that the deflection characteristics of the spring are reduced to one-twentieth of the 100% value, a level change of 0.6 inch would produce an output pressure change of 12 lbs., that is, under the original condition just referred to, a level of 5.7 inches will produce a 2 lbs. output pressure and a level of 6.3 inches will produce 14 lbs. output pressure. By this means, the proportioning band has been reduced to one-tenth of the 50% band or to a 5% proportioning band as indicated diagrammatically in Fig. 17.

Since, as described above, the tension of the spring 169 and the position of the screw 155 can be made such that with the level at the mid position of the maximum proportioning band a mid value of the range of output pressure exists in bellows 70 when the cantilever spring is in its neutral position, and since adjusting the clamp 180 along the spring does not distort the spring from its neutral position, it follows that the level which corresponds to the middle of any one proportioning band also corresponds to the middle of all proportioning bands. Therefore, the proportioning bands are adjusted uniformly on each side of a mid value. It is understood that in any proportioning control the level must occupy varying positions within the proportioning band in order to produce output pressures which would correspond to various demands of flow of the control agent, such as the flow of liquid through the valve 13 in pipe 14 (Fig. 1) in the control application herein illustrated. However, when the mid value of the proportioning band produces the mid value of the output pressure, the possible variation of the balance point of the level under automatic control of the level due to readjusting the proportioning band, is reduced to the minimum.

The reasons for providing an arc shaped arm 40 and for mounting it in the various positions described, will appear from the following:

From the description herein set forth of the pneumatic operation of the controller, it may be observed that lowering the point of connection 150, that is, the connection of the spring-wire flexure 138 with the bracket projection 152 (Fig. 7) increased the output pressure of the controller and, conversely, raising this point decreases the output pressure, as diagrammatically illustrated in Fig. 18. It may be observed further that when the arm 40 is mounted on the left of the torque tube shaft 41, as shown in full lines in Figs. 5 and 18, it will be necessary for the motion of the buoyancy member 25 to rotate the torque tube shaft 41 counterclockwise to increase the output pressure and clockwise to decrease the output pressure, that is, for the construction shown, an increase of level will increase the output pressure and a decrease of level will decrease the output pressure. If, however, the arm 40 is mounted on the right of the shaft 41, as indicated by dotted lines in Figs. 5 and 18, increase of level will decrease the output pressure and vice versa. If the buoyancy member 25 is mounted to the left of the controller, as may be readily accomplished by reversing the position of the chamber 21 and the flanges 33 and 35, the rotation of the arm 40 for increasing or decreasing the level is reversed.

Referring again to the buoyancy member mounting as shown in Fig. 1 and to the left hand mounting of the arm 40, and assuming the proportioning band to be 12 inches (100%), it is noted that regardless of the specific gravity of the liquid, the point of connection 150 will be in its uppermost position for zero level of liquid (see Fig. 18). Since, as explained above, the upper end of the link 135 is secured to the arm 40 at various positions in the slot 145 which positions correspond to the buoyancy member travel for various specific gravities, and since I have assumed that a zero level of any specific gravity liquid will give a minimum output pressure of 2 lbs., I have provided as shown in Fig. 6 that the pins 92, 93 and holes 90 and 91 position the arm 40 so that the slot 145 is arced around the position of the connection 150 which produces 2 lbs. pressure in the bellows 70 for all specific gravity settings when the proportioning band is 100% (see particularly Fig. 18 which diagrammatically illustrates a 100% proportioning band).

For reversing the pressure reactions to level changes as may be required for certain applications, the arm 40 is mounted on the right hand of the shaft 41, as indicated in dotted lines in Fig. 18. Under these conditions, zero level of any liquid would position the point of connection 150 in its lowermost position, and since for this control action minimum level should give 14 lbs. output pressure for any specific gravity liquid, when the proportioning band is 100%, I have provided that the pins 92, 93 and holes 94 and 95 (see Fig. 6) position the arm so that the slot is arced around that position of the connection 150 which will produce 14 lbs. pressure in bellows 70. Thus, 14 lbs. output pressure exists for zero level at all specific gravity settings. Since the two positions of the connection 150 which correspond to 2 lbs. and 14 lbs. output pressure are above and below, respectively, a mid position of the connection 150, the center line of the arc shaped slot 145 (see Fig. 18) should be above the center of rotation of the shaft 41 when the output pressure is to remain at 2 lbs. for all gravity adjustments and the center line of the slot should be below the center of rotation of the shaft when the output pressure is to remain at 14 lbs. for all gravity adjustments. For this purpose, I have provided that the pins 92, 93 and the corresponding holes also raise or lower the arm 40 so that the slot will be arced around the high position of the connection 150 for one mounting of the arm and around the low position of the connection 150 for the opposite mounting of the arm.

As pointed out hereinabove, the controller embodying this invention is adapted for use in connection with any type of condition value response and is capable of being actuated directly by small proportional motions of any condition sensitive element with negligible power requirements. Since the motions afforded by condition value responsive devices may vary with the individual construction of each device, and since the extent of movement produced by each device for each control application is dependent on the selected range of condition value change, I provide means in the form of the plate 83 and the arch shaped arm 40 combined with the link adjustment (i. e. the clamp 143), described above, whereby the motion afforded by any condition response device or any portion of that motion may be suited to the range of movement required by the pneumatic control mechanism. For convenience, I have illustrated the controller 10 as operating in conjunction with the proportioning liquid level response 11 and I may therefore use this application to illustrate these two features, that is first, adapting the motion of the buoyancy member for different specific gravities to the requirements of the control mechanism and second, adapting any portion of that range of motion to the requirements of the controller.

Referring to the first feature, it is well understood by those skilled in the art, that when the buoyancy member is operating in liquid having a gravity of 1.0, its motion per unit change of level is twice as great as when operating in liquid having a gravity of 0.5, for example, since the proportional movement of the buoyancy member varies directly with the change in gravity of the liquid. Because of this variance in buoyancy member travel, the arm 40 may be calibrated in specific gravities as indicated at 194 in Figs. 5 and 6 such that the effective lever length for various gravity settings will accommodate the motion of the buoyancy member for that gravity, to the requirements of the pneumatic control mechanism and give the same high and low level values.

Referring to the second feature, it may be desirable to raise the lower limit of level without altering the upper limit of level as for example, utilizing the upper half of the available buoyancy member travel. In such case an adapter plate, such as shown at 83' in Fig. 6a, would be used having suitable locations for the holes 88'—89', 90'—91' and 94'—95' so that the arm 40 would be arced around the 2 lb. or 14 lb. positions of connection 150 when the buoyancy member is half submerged. This is illustrated diagrammatically in Fig. 19 showing the relative positions of arm 40 in dotted lines and full lines respectively for ranges R and R'. In dotted lines, the arm 40 is shown as arced around the 2 lb. position, for example, of connection 150 when the buoyancy member is at its lowermost position so that minimum level is represented by this position and the range of the controller is represented by R. In full lines, the arm 40 is shown rotated clockwise with respect to the dotted line position so that the buoyancy member must be raised to the mid position in order that the arm may be arced around the 2 lb. position of connection 150. Thus the minimum level is at the mid position and the range becomes R' when the link 135 is adjusted to the full line position shown to adapt the reduced range of buoyancy member travel to the requirements of the controller.

It will be understood that such alterations to obtain suppressed ranges are particularly adaptable to other types of condition measuring elements such as temperature, pressure and the like wherein it is desirable to utilize only some portion of a given range of such element. These features are particularly valuable in the economical manufacture of controllers since they permit fewer ranges of basic elements and wide tolerance in the range specifications of such elements.

In the manufacture of pneumatic controllers of conventional construction, it has been the practice to select a measuring element which is not only suitable for measuring the controlled variable, such as liquid level, pressure, temperature, rate of flow and the like, but one which has a range of angular motion corresponding closely to the angular motion required by the pneumatic control mechanism. This has been necessary because pneumatic controllers of conventional construction require relatively large angular motions of levers associated with the control mechanism which would result in calibration errors if the magnitude of angular motions of the levers associated with the measuring element, differed materially from the magnitude of the angular motions of the levers associated with the pneumatic control mechanism. By means of the structural features of the pneumatic control mechanism herein disclosed, wherein the controller is not only responsive to very small motions, but the maximum angular motions of the operating levers are extremely small, it becomes possible to use relatively small angular motions of levers associated with the measuring element and to transmit widely different angular motions without appreciable calibration errors, thereby permitting a single element to be utilized for measuring a wide variety of ranges of condition value change.

Furthermore, the use of the arc shaped arm 40 and the method of mounting said arm as described, not only adjusts the motion transmitted to the control mechanism by the measuring element and thus, in effect, adjusts the usable range of the element, but permits such range adjustment without the necessity of altering the relative positions of any other parts. This not only permits the manufacture of fewer basic elements for a variety of ranges but simplifies production calibration and permits range changes in the field without loss of calibration. Again, by reason of the construction and organization of parts herein disclosed, it becomes possible to utilize the arc adjustment for range calibration. This makes it practical to manufacture and assemble the controller parts on a quantity basis and to compensate for production and assembly tolerance by one final adjustment, namely, the adjustment of the micrometer screw 155, as previously described.

In referring to the operation of the pneumatic control mechanism, I have described the output pressure reactions for various adjustments and assemblies in response to changes in the level of liquid in chamber 21. In commercial applications of this control for governing the level of a liquid in a vessel, the complete mechanism would be attached to a vessel, such as 12 in Fig. 1 as previously described. In the control application shown, the controller is applied to operate the valve 13 in such a way as to maintain the level of liquid in the vessel 12 within a certain band of level change. That is, if the flow of liquid into the vessel through the pipe 15 should decrease, tending to decrease the level, the controller would react to the decrease in level and close the valve 13 a proportionate amount, thereby reducing the rate of level drop and eventually preventing the level from dropping further. Therefore, when there is a given decrease in inlet flow, the level in the vessel will continue to drop until there has been an equivalent decrease in the outlet flow, and the amount by which the level would drop for a given decrease in inlet flow would depend on the amount of decrease in inlet flow and on the quantity change in outlet flow per unit of level drop in the vessel 12. Thus the actual drop of level is a function of the proportioning band adjustment of the controlled. On the other hand, an increase of level of liquid in the vessel 12, would govern the level by the opposite control reactions and the actual level change is again a function of the width of the proportioning band.

Considering the effect of the proportioning band alone, the smaller the proportioning band, the less the level changes for a given change in inlet flow. It would therefore seem desirable that the smallest proportioning band should always be used. However, in commercial applications of controls, process lags are often involved in the reactions of the process and the controller. These lags limit the minimum proportioning band that may be used without producing undesirable cyclic control. Although the simple application shown in Fig. 1 does not indicate any appreciable lag characteristics, many commercial applications of proportional control to level as well as more complex problems in temperature control, for example, will involve appreciable lag characteristics, and it becomes highly desirable that the proportioning band may be adjustable over a wide range and that the adjustments are capable of accurate duplication which is one of the features, previously described, of the controller embodying this invention.

While I have described the particular level control application shown in Fig. 1, it is understood that it may be necessary to close the valve on an increase of level, such as for example, if the same type of valve 13 is used to govern flow through the inlet pipe 15, and for this and other reasons such as reversing the action of the valve 13 in the application shown, it may be necessary to reverse the control action in the field. I have provided, as explained, means for reversing the control action in the field without altering the range of the controller or without requiring adjustment of any other parts.

Having herein described my invention, what I claim as new, and desire to secure by Letters Patent, is:

1. In a pneumatic controller including a fluid pressure system having a source of fluid pressure, and a valve having a valve member for varying the pressure in the system, the combination with a measuring element is movable in response to a change in the value of a condition, and a rotatably mounted arm directly connected to said element, of a lever having a spring pivot mounting and acting directly on the valve member, and a link including a stiffened portion having a spring wire connection with said lever and a spring wire connection with said arm for acting directly on said lever.

2. In a pneumatic controller including a fluid pressure system having a source of fluid pressure, and a valve having a valve member for varying the pressure in the system, the combination with a measuring element movable in response to a change in the value of a condition, a rotatably mounted arm directly connected to said element, a lever having a spring pivot mounting and acting directly on the valve member, and a link including a stiffened portion having a spring wire connection with said lever and a spring wire connection with said arm directly connecting said arm with said lever, of means responsive to a change of pressure in the system and movable in linear proportion to said pressure change for varying the position of said spring pivot mounting.

3. In a pneumatic controller including a fluid pressure system having a source of fluid pressure, and a valve having a valve member for varying the pressure in the system, the combination with a measuring element movable in response to a change in the value of a condition, and a rotatably mounted arm directly connected to said element, a lever having a spring pivot mounting and acting directly on the valve member, and a link including a stiffened portion having a spring wire connection with said arm and a spring wire connection with said lever for acting directly on said lever, of means responsive to a change of pressure in said system and movable in linear proportion to said pressure change for varying the position of said spring pivot mounting.

4. In a pneumatic controller including a fluid pressure system having a source of fluid pressure, and a valve having a valve member for varying the pressure in the system, the combination with a measuring element movable in response to a change in the value of a condition, and a rotatably mounted arm directly connected to said element, of a lever having a pivotal mounting and acting directly on said valve member, an expansible chamber having a wall portion movable in response to a change of pressure in the system and in operable connection with the pivotal mounting of said lever, a link including a stiffened portion having a spring wire connection with said lever and a spring wire connection with said arm directly connecting said arm with said lever, and means for varying in linear proportion the movement of said expansible chamber per increment change of pressure in the system.

5. In a pneumatic controller for governing the value of a variable and including a fluid pressure system having a selected range of pressure change, a source of pressure for said system, and a valve for varying the pressure in said system over said range of pressure change, in combination, a valve operating member, and means jointly actuating said member, said means comprising, a measuring element responsive proportionally to a change in the value of the variable for actuating initially said valve tending to provide a maximum change of pressure in said system in response to a unit change in variable value, and a proportioning device having a unitary movement per increment of pressure change in said system and comprising an expansible chamber in fluid communication with the system, yielding means including a leaf spring opposing the expansion of said chamber, said proportioning device reacting to minute changes of pressure in said system to arrest the tendency to maximum pressure change initiated by said measuring element and balancing the pressure at a new value the change in which per unit of variable change is proportional to the unitary movement of said proportioning device per unit of system pressure change, and means for adjusting the leaf spring to alter its rate.

6. In a pneumatic controller for governing the value of a variable and including a fluid pressure system having a selected range of pressure change, a source of pressure for said system, and a valve for varying the pressure in said system over said range of pressure change, in combination, a valve operating member, and means jointly actuating said member, said means comprising, a measuring element responsive proportionally to a change in the value of the variable for actuating initially said valve tending to provide a maximum change of pressure in said system in response to a unit change in variable value, and a proportioning device having a unitary movement per increment of pressure change in said system and comprising an expansible chamber in fluid communication with the system and two resilient means one of which opposes in a positive sense only the pressure in said chamber throughout the entire range of pressure change and the other of which opposes the pressure in said chamber negatively through a portion of its range and positively through the remaining portion of its range.

7. In a pneumatic controller for governing the value of a variable and including a fluid pressure system having a selected range of pressure change, a source of pressure for said system, and a valve for varying the pressure in said system over said range of pressure change, in combination, a valve operating member, and means jointly actuating said member, said means comprising, a measuring element responsive proportionally to a change in the value of the variable for actuating initially said valve tending to provide a maximum change of pressure in said system in response to a unit change in variable value, and a proportioning device having a unitary movement per increment of pressure change in said system and comprising an expansible chamber in fluid communication with the system, two resilient means one of which opposes in a positive sense only the pressure in said chamber throughout the entire range of pressure change and the other of which opposes the pressure in said chamber negatively through a portion of its range and positively through the remaining portion of its range, and means for adjusting the deflection characteristics of said last mentioned means in both directions from the position of zero opposition.

8. In a pneumatic controller for governing the value of a condition, and including a fluid pressure system having a source of fluid pressure, and a valve for varying the pressure in the system, the combination with a measuring element in operative connection with said valve and movable in response to a change in the value of the condition and tending to initiate a maximum change of pressure in the system, of a proportioning device in operative connection with said valve and movable to minute changes of pressure in the system to arrest the tendency to maximum pressure change initiated by said measuring element, said proportioning device comprising an expansible chamber responsive to a change of pressure in the system, resilient means opposing the expansion of said chamber, and a rigidly mounted leaf spring having a free portion deflectable by said chamber and resilient means to each side of an intermediate normal position.

9. In a pneumatic controller for governing the value of a condition, and including a fluid pressure system having a source of fluid pressure, and a valve for varying the pressure in the system, the combination with a measuring element in operative connection with said valve and movable in response to a change in the value of the condition and tending to initiate a maximum change of pressure in the system, of a proportioning device in operative connection with said valve and movable to minute changes of pressure in the system to arrest the tendency to maximum pressure change initiated by said measuring element, said proportioning device comprising an expansible chamber responsive to a change of pressure in the system, resilient means opposing the expansion of said chamber, a rigidly mounted leaf spring having a free portion deflectable by said chamber and resilient means to each side of an intermediate normal position, and an adjustable clamp for varying the free length of said leaf spring.

10. In a controller having a fluid pressure system, a source of fluid pressure therefore, and means responsive to changes in the value of a variable, a valve and associated operating and control point setting mechanism, comprising, a nozzle in fluid connection with the fluid pressure system, a baffle, a control point setting arm on which said nozzle is rigidly mounted and said baffle is pivotally mounted, the relative positions of said mountings being such that the plane of the baffle is substantially in parallel with the plane of the nozzle orifice when the said members are in contact, a support, a spring leaf flexure connecting said setting arm with said support, a pivoted lever operatively connecting said variable response means with said baffle to vary the nozzle-baffle relation, and means for rotating said setting arm about said spring leaf flexure to vary the position of said nozzle in respect to said lever without disturbing the said parallel relationship.

11. In a pneumatic controller for governing the value of a variable and including a fluid pressure system having a selected range of pressure change, a source of fluid pressure for said system, a valve for varying the pressure in said system over said range of pressure change, a measuring element responsive to changes in the value of the variable, and a valve operating lever connected with said valve and having a definite range of control movement for varying the fluid pressure in said system throughout said selected range of pressure change, means connecting said measuring element with said lever and accommodating the movement afforded by the measuring element for a selected range of variable change to the range of control movement of the operating lever, comprising, an arm in operative connection with said measuring element and adapted to be rotated thereby, a link, a first pivotal connection between said link and said arm and a second pivotal connection between said link and said valve operating lever, and means for securing said first pivotal connection at a plurality of positions along a selected arc, said link having an effective length substantially equal to the radius of said arc, the parts being arranged so that for a selected value of the variable the center of radius of the arc coincides with the second pivotal connection when the link positions the lever to produce one limit of the range of pressure change.

12. In a pneumatic controller for governing the value of a variable and including a fluid pressure system having a selected range of pressure change, a source of fluid pressure for said system, a valve for varying the pressure in said system over said range of pressure change, a measuring element responsive to changes in the value of the variable, a proportioning device responsive to changes of pressure in said fluid system and having a selected range of movement in response to pressure changes over said range of pressure change, and a lever operatively connecting said valve with said measuring element and said proportioning device and having a definite range of control movement for varying the pressure in said fluid system throughout said selected range of pressure change, means for accommodating the movement afforded by said measuring element for a selected range of variable change to the range of control movement of said lever, comprising, an arm in operative connection with said measuring element and adapted to be rotated thereby, a link, a first pivotal connection between said link and said arm, a second pivotal connection between said link and said lever, and means for securing said first pivotal connection at a plurality of positions along a selected arc, said link having an effective length substantially equal to the radius of said arc, the parts being arranged so that for a selected value of the variable the center of radius of said arc coincides with said second pivotal connection when said link positions said lever to produce one limit of the range of pressure change.

13. In a pneumatic controller for governing the value of a variable and including a fluid pressure system having a selected range of pressure change, a source of fluid pressure for said system, a valve for varying the pressure in said system over said range of pressure change, a measuring element responsive to changes in the value of the variable, and a valve operating lever connected with said valve and having a definite range of control movement for varying the fluid pressure in said system throughout said selected range of pressure change, means connecting said measuring element with said lever and accommodating the movement afforded by the measuring element for a selected range of variable change to the range of control movement of the valve operating lever, comprising, a rotatably mounted arm in operative connection with said measuring element and having a slot therein disposed along a selected arc, a link, a first spring wire connection rigidly attached to said link and to said valve operating lever and forming a first pivotal connection, a second spring wire connection rigidly attached to said link, and adjustment means for securing said second spring wire connection at a plurality of positions along said arc shaped slot, including, a clamp rigidly attached to said second spring wire connection, guide pins associated with said clamp and cooperating with said slot to position the axis of said wire normally at right angles to the tangent of the arc of the slot at various positions lengthwise thereof, said link having an effective length substantially equal to the radius of said arc, the parts being arranged so that for a selected value of the variable the center of radius of the said arc coincides with said first pivotal connection when said link positions said lever to produce one limit of the range of pressure change.

14. In a pneumatic controller for governing the value of a variable and including a fluid pressure system having a selected range of pressure change, a source of fluid pressure for said system, a valve for varying the pressure in said system over said range of pressure change, a measuring element responsive to changes in the value of the variable, a proportioning device responsive to changes of pressure in said fluid system and having a selected range of movement in response to pressure changes over said range of pressure change, and a lever operatively connecting said valve with said measuring element and said proportioning device and having a definite range of control movement for varying the pressure in said fluid system throughout said selected range of pressure change, means for accommodating the movement afforded by said measuring element for a selected range of variable change to the range of control movement of said lever and for reversing the direction of pressure change in said fluid pressure system for a given change of the variable, comprising, a shaft rotatable by said measuring element, a lever arm, attachment means for mounting said lever arm on opposite sides of said shaft, a link, a first pivotal connection between said link and said lever arm, a second pivotal connection between said link and said valve operating lever, and a third pivotal connection between said valve operating lever and said proportioning device, said lever arm having a path of adjustment for said first pivotal connection along a selected arc, said link having an effective length substantially equal to the radius of said arc, and said attachment means having locating means for positioning said arc both radially and transversely of the axis of said shaft when mounted on one side of the shaft so that for a selected value of the variable the center of radius of said arc coincides with said second pivotal connection when said link positions said valve operating lever to produce one limit of the range of pressure change, and said attachment means having locating means for similarly positioning the arc on the other side of said shaft so that for said selected value of the variable the center of radius of the arc coincides with the second pivotal connection when said link positions said valve operating lever to produce the opposite limit of the range of pressure change.

15. In a pneumatic controller for governing the value of a variable and including a fluid pressure system having a selected range of pressure change, a source of fluid pressure for said system, a valve for varying the pressure in said system over said range of pressure change, a measuring element responsive to changes in the value of the variable, and a valve operating lever connected with said valve and having a definite range of control movement for varying the fluid pressure in said system throughout said selected range of pressure change, means connecting said measuring element to said lever and accommodating the movement afforded by said measuring element for a selected range of variable change to the range of control movement of the valve operating lever, combined with means for reversing the action of said valve, comprising, a shaft in operative connection with said measuring element for rotation thereby, an arm, a first member secured to said shaft, a second member secured to said arm, and an adapter member having detachable connections with said members, a link, a first pivotal connection between said link and said arm and a second pivotal connection between said link and said valve operating lever, means for securing said first pivotal connection at a plurality of positions on said arm along a selected arc, said link having an effective length substantially equal to the radius of said arc, the said detachable connections between said adapter member and said first and second members combining to position said arc both radially and transversely of the axis of said shaft when mounted on one side of the shaft so that for a selected value of the variable the center of radius of said arc coincides with said second pivotal connection when said link positions said valve operating lever to produce one limit of said range of pressure change, and said detachable connections combining similarly to position said arc when mounted on the other side of said shaft so that for said selected value of the variable the center of radius of the arc coincides with the second pivotal connection when the link positions the valve operating lever to produce the opposite limit of the range of pressure change.

16. In a pneumatic controller including a fluid pressure system having a source of fluid pressure, and a valve having a valve member for varying the pressure in the system, the combination of a measuring element movable in response to a change in the value of a condition, an arm connected to said measuring element and oscillatable thereby in a definite plane, a spring wire connection rigidly attached to said arm, a relatively stiff link member, said spring wire connection being rigidly attached to said link member, a second spring wire connection rigidly attached to said link member, a lever connected to said valve member and pivotedly mounted for oscillation in a definite plane, and means for rigidly attaching said second spring wire connection to said lever.

17. In a pneumatic controller including a fluid pressure system having a source of fluid pressure, and a valve having a valve member for varying the pressure in the system, the combination of a measuring element movable in response to a change in the value of a condition, an arm connected to said measuring element and oscillatable thereby in a definite plane, a spring wire connection rigidly attached to said arm, a relatively stiff link member, said spring wire connection being rigidly attached to said link member, a second spring wire connection rigidly attached to said link member, a lever connected to said valve member, a mounting for said lever, a spring leaf flexure connecting said lever to said mounting providing for oscillation of the lever in a definite plane, and means for rigidly attaching said second spring wire connection to said lever.

18. In a pneumatic controller including a fluid pressure system having a source of fluid pressure, and a valve having a valve member for varying the pressure in the system, the combination of a measuring element movable in response to a change in the value of a condition, an arm connected to said measuring element and oscillatable thereby in a definite plane, a spring wire rigidly attached to said arm, a lever connected to said valve member and pivotedly mounted for oscillation in a definite plane, said spring wire being rigidly attached to said lever, and means for stiffening a suitable portion of said spring wire.

19. In a pneumatic controller including a fluid pressure system having a source of fluid pressure, and a valve having a valve member for varying the pressure in the system, the combination of a measuring element movable in response to a change in the value of a condition, an arm connected to said measuring element and oscillatable thereby in a definite plane, a spring wire rigidly attached to said arm, a lever connected to said valve member and pivotedly mounted for oscillation in a definite plane, said spring wire being rigidly attached to said lever, a tubular member through which said spring wire extends and projects from the ends thereof, and means rigidly connecting said spring wire with said tubular member.

20. In a pneumatic controller for governing the value of a variable and including a fluid pressure system having a selected range of pressure change, a source of pressure for said system, and a valve for varying the pressure in said system over said range of pressure change, in combination, a valve operating member, and means jointly actuating said member, said means comprising, a first element responsive proportionally to a change in the value of the variable for actuating initially said valve tending to provide a maximum change of pressure in said system in response to a unit change in variable value, a second element having a portion movable in response to a change of pressure in said system, resilient means associated with said second element the deflection of which is characterized to effect a predetermined movement of the movable portion of said second element which movement is directly proportional to a pressure change in said system, said second element reacting to minute changes of pressure in said system to arrest the tendency to maximum pressure change initiated by said first element and balancing the pressure at a new value which is directly proportional to the change in variable value, and means for changing the deflection characteristic of said resilient means to vary the predetermined movement of said second element.

CLESSON E. MASON.

REFERENCES CITED

The following references are of record in the file of this patent:

UNITED STATES PATENTS

| Number | Name | Date |
|---|---|---|
| 1,593,430 | Bryson | July 20, 1926 |
| 1,627,936 | Swenson | May 10, 1927 |
| 1,817,255 | Hawley | Aug. 1, 1931 |
| 2,082,258 | Paradise | June 1, 1937 |
| 2,096,179 | Irwin | Oct. 19, 1937 |
| 2,141,464 | Gorrie | Dec. 27, 1938 |
| 2,145,602 | Kingan | Jan. 31, 1939 |
| 2,156,496 | Handwerk | May 2, 1939 |
| 2,216,039 | Mason | Sept. 24, 1940 |
| 2,248,322 | Annin | July 8, 1941 |
| 2,263,771 | Griffey | Nov. 25, 1941 |
| 2,264,261 | Erbguth | Nov. 25, 1941 |
| 2,296,213 | Kretzschmar | Sept. 15, 1942 |
| 2,298,112 | Edwards | Oct. 6, 1942 |
| 2,332,627 | Erbguth | Oct. 26, 1943 |
| 2,342,830 | Bate | Feb. 29, 1944 |
| 2,349,332 | Angell | May 23, 1944 |
| 2,360,889 | Philbrick | Oct. 24, 1944 |
| 2,369,463 | Ibbott | Feb. 13, 1945 |
| 2,380,858 | McMahon | July 31, 1945 |
| 2,455,233 | Copeland | Nov. 30, 1948 |
| 2,461,026 | Bilyeu | Feb. 8, 1949 |

FOREIGN PATENTS

| Number | Country | Date |
|---|---|---|
| 530,942 | Great Britain | May 10, 1940 |